Nov. 2, 1926.
F. J. LAHER
1,605,594
AUTOMOBILE BUMPER
Filed Feb. 23, 1926
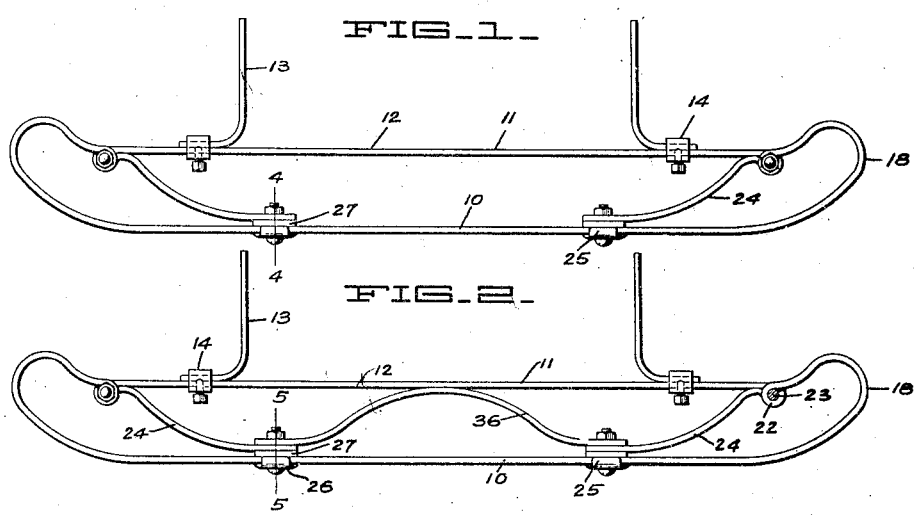
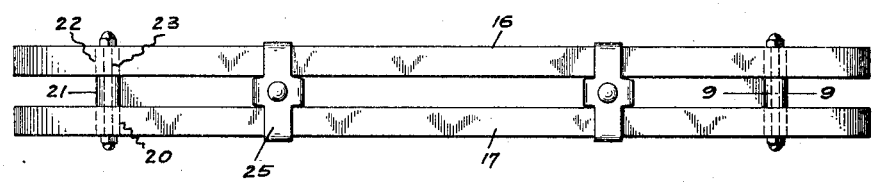
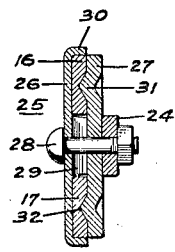 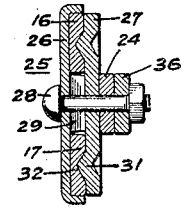 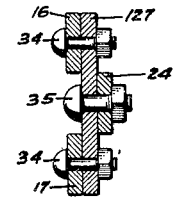
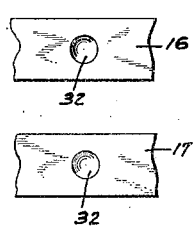 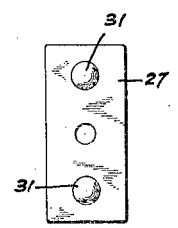 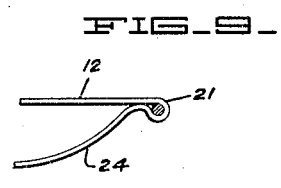
INVENTOR
Frank J. Laher
BY White Prost
his ATTORNEYS Patented Nov. 2, 1926.

1,605,594

UNITED STATES PATENT OFFICE.

FRANK J. LAHER, OF OAKLAND, CALIFORNIA.

AUTOMOBILE BUMPER.

Application filed February 23, 1926. Serial No. 90,004.

This invention relates to devices known as bumpers and which are employed on automobiles or other vehicles for absorbing impacts.

Bumpers are commonly constructed by connecting together a front impact member with one or more support members in such a manner as to allow a certain amount of "give" to the impact member. The impact member is made of one or more horizontal bars supported adjacent their ends so that it is necessary to reinforce the central or intermediate portion of the same. This is usually accomplished by inserting cantilever springs between the impact and support members which are placed under a bending stress by an impact.

It is an object of this invention to reinforce the intermediate portion of the impact member of a bumper by means of truss members which are placed under compressional stresses in resisting forward impacts.

It is a further object of this invention to devise a bumper which will be pleasing in appearance, may be cheaply manufactured and will possess sufficient strength and resilience to absorb heavy impacts.

Further objects of the invention will appear from the following description in which the preferred embodiments of the invention have been set forth in detail.

Referring to the drawings:

Figure 1 is a plan view of a bumper embodying the teachings of this invention.

Fig. 2 is a plan view of a modification of the construction shown in Fig. 1.

Fig. 3 is a front elevational view of the construction shown in Fig. 1.

Fig. 4 is a cross sectional view taken along the line 4—4 of Fig. 1.

Fig. 5 is a cross sectional view taken along the line 5—5 of Fig. 2.

Fig. 6 is a cross sectional view similar to Figs. 4 and 5 but showing a modified form of clamp.

Fig. 7 is a detail view of a portion of the impact member showing the indentations which are employed with the clamps shown in Figs. 4 and 5.

Fig. 8 is a detail view showing a portion of the clamps shown in Figs. 4 and 5.

Fig. 9 is a cross sectional view taken along the line 9—9 of Fig. 3.

The device comprises generally an impact member 10 which is adapted to be positioned in operative relation upon an automobile or other vehicle by means of a support member 11. The support member includes a horizontal bar 12 which is supported by means of a pair of brackets 13 extending from the frame of an automobile. Suitable means such as clamps 14 are employed for securing together the brackets 13 and the bar 12. The impact member 10 includes a plurality of vertically spaced bars 16 and 17 which are suitably secured to the ends of the support bar 12. Both support and impact bars are constructed of suitable metal such as spring steel. In the particular construction shown, the impact bars 16 and 17 are provided with open looped ends 18 and their corresponding terminals are provided with eyes 20 and 22 which register vertically with an eye 21 formed on the end of the support bar 12. A pin or bolt 23 extending through the eyes 20, 21 and 22 serves to pivotally connect the impact and support members.

In order to reinforce the intermediate portion of the impact member there are provided a plurality of truss elements or bars 24 which are preferably oppositely inclined with respect to the front of the impact member. These truss elements are intended to resist impact forces by compressional stresses and therefore it is essential that their ends be securely anchored to the impact and support members. In the particular construction illustrated, each truss bar 24 is made a continuation of the end of the support bar 12 so that both truss bars 24 and the support bar 12 are formed of a single piece of material. The inner end of each truss bar 24 is anchored to the impact member through a clamp 25, the two clamps 25 being located at spaced points intermediate the ends of the impact member. In the past clamps have been employed for connecting the reinforcing and impact members but since no special provision was made for locking the clamps to the impact bar they would permit relative movement between the reinforcing and impact members. A reinforcing member connected to the impact member in this manner cannot act as a truss but will only resist impacts by means of bending stresses or by serving as a cantilever. The applicant's clamps however have been constructed so as to securely anchor the outer end of each truss element to the impact bar.

Thus, as shown in Fig. 4, the clamps 25 comprise a front plate 26 and a rear plate 27 which are retained against opposite sides of the bars 16 and 17 by means of the bolts 28. The front plate 26 is preferably provided with spacers 29 and also with lugs 30 for retaining the impact bars in spaced relationship. The plate 27 is provided with pressed-out projections 31 which are adapted to interlock the indentations 32 in the bars 16 and 17. The outer end of each truss element 24 is also secured to the clamp 25 as by means of the bolts 28 as shown in Fig. 4. In the modified form of clamping means shown in Fig. 6, a single plate 127 is employed which is secured to the impact bars 16 and 17 by means of bolts 34 and is also secured to the outer end of each truss element 24 by means of bolts 35.

In the modified construction shown in Fig. 2, means is provided for reinforcing the bumper against impacts concentrated near the center of the impact member. Thus there is provided a single bar 36 having its ends anchored at spaced points to the impact bar preferably by means of the bolts 28 as shown in Fig. 5. This bar is bent rearwardly so that its central portion contacts with the central portion of the support bar 12, thereby transmitting a portion of an impact force to the central portion of the support bar.

When a front impact force is received by this bumper the truss members 24 are placed under compression, the support bar 11 under tension and that portion of the impact member between the clamps 25 will be placed under compression. The requisite "give" will be supplied by a slight buckling of the truss bars 24, thus permitting the impact member to move closer to the pins 23. Also the ends of the support bar 12 will flex under a bending stress. When side impacts are received, the arrangement permits more "give" as such forces will not be directly transmitted as compressional stresses in the truss bars 24 but will be resisted by bending stresses in the end loops 18. This is desirable since side impacts are seldom as intense as forward impacts. Since the truss bars 24 act as compressional members they may be of relatively light construction and the cost of the bumper accordingly cheapened.

I claim:

1. An automobile bumper comprising support and impact members, one of said members having open looped ends secured at two spaced points to said other member, and reinforcing members each secured to one of the members adjacent one of said points and extended into contact with the other member.

2. An automobile bumper comprising an impact member formed with looped ends, support means secured to each of said ends by means of a single pivotal connection and intermediate bars having their rear ends connected to said pivotal connection and having their forward ends connected to said impact member.

3. An automobile bumper comprising an impact member formed with looped ends, support means secured to each of said ends by means of a single pivotal connection and oppositely inclined truss bars having their rear ends connected to said pivotal connection and their front ends fixedly secured to said impact member whereby forward impacts will be opposed by compressional stresses in said bars.

4. An automobile bumper comprising an elongated front impact member, a rear support bar spaced from said impact member and adapted to support the bumper on an automobile, a pair of oppositely inclined truss bars connecting said impact member and support bar, each truss bar having its one end anchored to said support bar at a point adjacent one end thereof and its other end anchored to said impact bar at a point intermediate the connections to said support bar, and means for transmitting a portion of the force of a front impact to the intermediate portion of the support bar.

5. An automobile bumper comprising a front impact member and a rear support member connected together, at least one truss element inclined with respect to said members, the inner end of said truss member being secured to said support member, and a clamp for securing the outer end to said impact member, said clamp having a portion interlocking with said impact member.

6. An automobile bumper comprising a front impact member, and a rear support bar having closed looped ends secured to said impact member, the ends of said support bar being extended from said closed loops and inclined forwardly and secured to said impact member intermediate the ends of said member to strengthen the same.

7. An automobile bumper comprising a front impact member having open looped ends, a support bar having closed looped ends, and pins securing together the terminals of the impact member and said closed looped ends, the ends of said support bar being extended and inclined forwardly and secured to said impact member to brace the intermediate portion of the same.

8. An automobile bumper comprising a front impact member having open looped ends, a rear support bar having closed looped ends pivotally secured to the terminals of said impact member, said support bar being extended and inclined forwardly and anchored to said impact member at spaced points, and a bent bar inter-connecting said spaced points and contacting with the central portion of the support bar.

9. An automobile bumper comprising a front impact member having eyes formed on its extremities, a rear support member having eyes formed on its extremities, pins for connecting together corresponding eyes, said eyes on one of said members being formed of bar material bent to form closed loops or eyes and extended from said eyes for attachment to the other of said members.

10. An automobile bumper having open looped ends comprising impact and support members, corresponding ends of said members being connected by a single pivotal connection, and a reinforcing bar having one end secured to one of said members adjacent one of said pivotal connections and its other end contacting with the other of said members.

11. An automobile bumper comprising an impact member, a continuous support bar spaced rearwardly from said impact member and pivotally secured to the same, and a bowed bar secured at its ends to one of said members and contacting with the central portion of the other of said members.

12. An automobile bumper having open looped ends comprising an impact member, a support bar spaced rearwardly from said impact member, and a bowed bar secured at its ends to one of said members and having its intermediate portion contacting with the other of said members.

13. An automobile bumper comprising impact and support members pivotally secured together to form open looped ends, said support member including a bar extending in spaced relationship to the rear of the impact member, and a bowed reinforcing bar secured to one of said members and adapted to contact with both of said members to reinforce the impact bar.

14. An automobile bumper comprising a support member, an impact member having open looped ends secured at two spaced points to said support member, and reinforcing members extending from the impact member to said points of attachment of the support and impact members.

In testimony whereof, I have hereunto set my hand.

FRANK J. LAHER.